2 Sheets—Sheet 1.
FOX & VAN HOOK.
Raking Attachment to Harvesters.
No. 45,597. Patented Dec. 27, 1864.
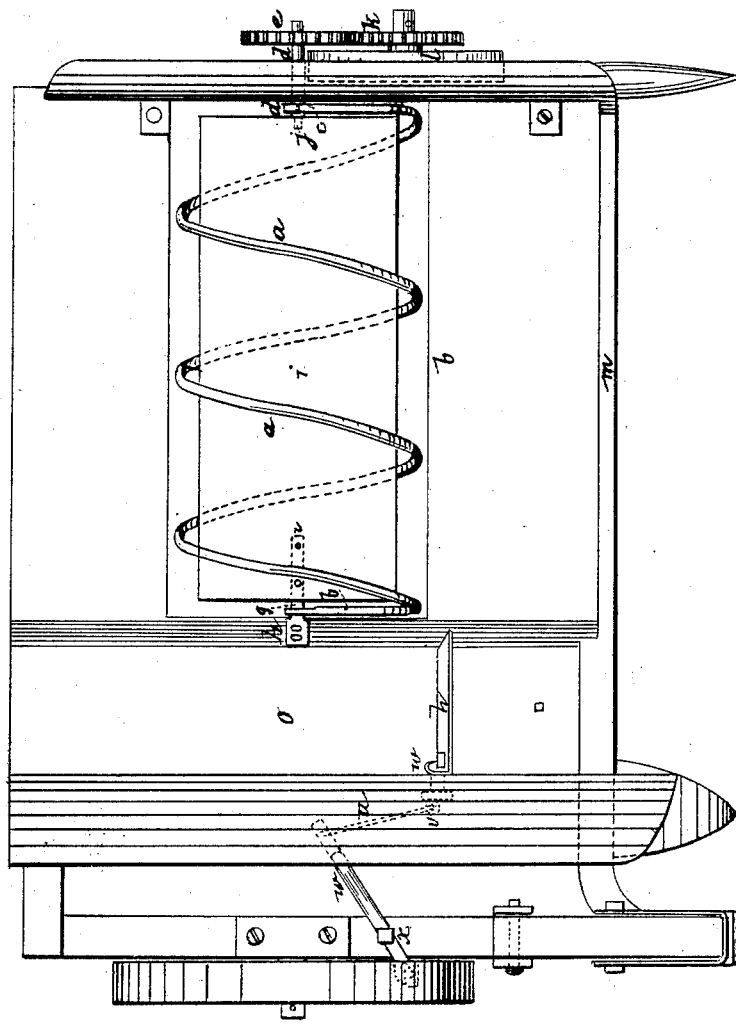

FOX & VAN HOOK.
Raking Attachment to Harvesters.

No. 45,597.

2 Sheets—Sheet 2.

Patented Dec. 27, 1864.

Witnesses.
J. Smith.
L. Jones.

Inventors.
J. Fox
J. W. Van Hook
by Att. Thos. J. Everett

UNITED STATES PATENT OFFICE.

JOHN FOX AND JOHN W. VAN HOOK, OF UNIONTOWN, D. C.

IMPROVEMENT IN RAKING ATTACHMENT TO HARVESTERS.

Specification forming part of Letters Patent No. 45,597, dated December 27, 1864.

*To all whom it may concern:*

Be it known that we, JOHN FOX and JOHN W. VAN HOOK, of Uniontown, in the county of Washington and District of Columbia, have invented a certain new and useful Improvement on Raker Attachments to Reapers; and we do hereby declare that the following is a full, clear, and exact description of the construction and operation of the same, reference being had to the accompanying drawings, and to the letters and marks thereon.

Figure 3:
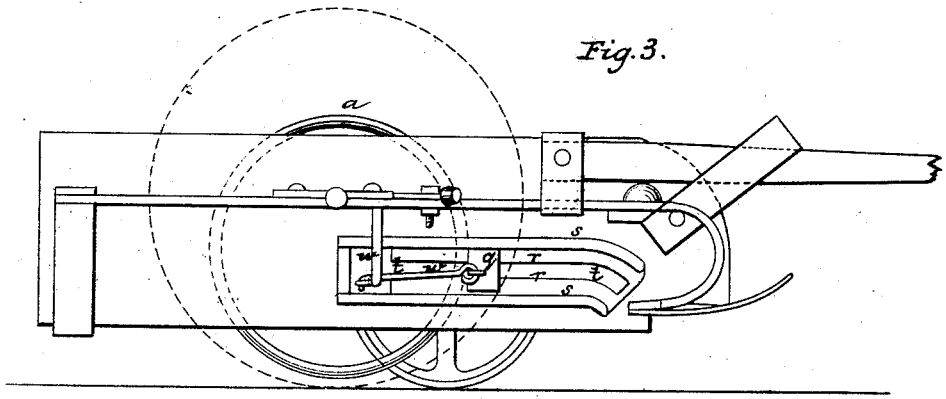
Figure 4:
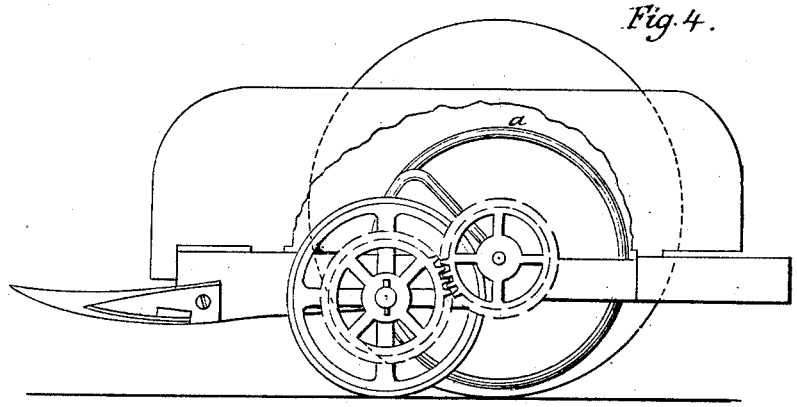
Figure 5:
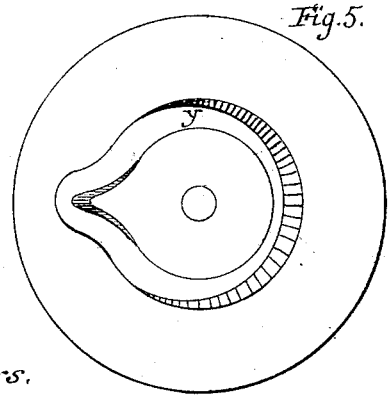

The drawings forming part of this specification show so much of a reaper as is necessary to illustrate our invention and fully exhibit the character and extent of our improvement attached thereto. Figure 1 of these drawings being a top view or view had by looking down upon the machine; Fig. 2 being a skeleton or line view of the platform and sides of the machine; Fig. 3 being a side view of the machine with the main wheel removed; Fig. 4, the opposite side view, and Fig. 5 a view of a cam-groove in the inner face of the main wheel.

In each of these figures where like parts are shown like marks and letters are used to indicate the parts.

The raker $a$ consists of a coiled rod or bar or strip of metal passing from one side of the platform $b$ to the other side in a helical line. The one end, $c$, of this rod is affixed to a short shaft, $d$, of the pinion $e$, while the other end, $f$, of this rod is flattened and by a hole through it rests around the rod or bar $g$, attached to the side plate, $h$, and to the interior or central platform or table, $i$. This interior or central platform is kept firm in its place by the bar $g$ as here named, its other end, $j$, being suspended upon the inner end of the short shaft, $d$, a hole or recess in this end of the central platform being made for the end of the short shaft. This condition of the parts is fully shown by Fig. 1 of the drawings, and this condition allows of the rotation or motion of the raker around the central platform, which rotation is produced by the gearing of the pinion $e$ with another pinion, $k$, affixed to the hub or shaft of the ground-wheel $l$. Now, it will readily be perceived that when the machine is in operation in the field of grain, the stalks having been cut—the bar $m$ indicating the cutter-bar—they will fall upon the front part of the main platform $b$, upon the central platform, $i$, and within the space formed by the coils of the rod-raker, and the line of the motion of the raker being toward the main-wheel side of the machine, the cut grain will be readily and entirely carried to that side of the machine, and there be deposited in a box or receptacle, $a$, provided for its reception.

It will be noticed that the platform of the machine is elevated so as to allow of the free and complete action and operation of the raker and the escape of clover or short grain between the cutter-bar and platform, the line of the platform being indicated by Fig. 2 of the drawings.

It is evident that this raker may be made with its coils nearer to or farther apart than is represented by the drawings, and that instead of being arranged with its central platform, as is shown, on a horizontal line, or nearly so, it may be arranged at any line or angle between a vertical and a horizontal line, suitable provision being made in the construction and arrangement of the other parts of the machine to adapt them to such inclined or angular position of the raker and its platform. When the cut grain has been delivered in the box or receptacle $o$ it will be passed out therefrom by an arrangement of means shown by Figs. 1, 3, and 5 of the drawings, so that it will be placed in a suitable position and condition for binding. A plate, $p$, is made to traverse backward and forward in the box $o$, its outer end having affixed to it a head or hub, $q$, which is grooved, and into which groove the sides $r$ of the plate $o$ forming the slot $t$ fit. This head or hub may be constructed in any of the usual ways of forming divided heads or hubs or grooved heads. To the outer end of this hub a link or rod, $u$, is connected by the eye $v$, the other end of the link, $u$, being attached to the crank-arm $w$, pivoted to the side bar, $x$. The outer end of arm $w$ fits into the cam-groove $y$ of the main wheel. Rotation of this main wheel then, through the means and devices here recited, operates the plate $p$ in the box or receptacle, and thus is the cut grain delivered in proper condition for binding.

What we claim as new, and desire to secure by Letters Patent, is—

1. A raker for a reaper constructed and operated substantially as herein set forth, in combination with the interior or central platform, constructed substantially as herein recited.

2. The arrangement of the means or devices herein recited for delivering the cut grain from the box or receptacle.

3. The raising of the main platform so that a space exists between it and the cutter-bar for the escape of the short grain and for affording the free operation of the raker, as described.

This specification signed this 17th day of November, 1864.

JOHN FOX.
JNO. W. VAN HOOK.

Witnesses:
THOS. T. EVERETT,
CHAS. V. GORDON.